United States Patent
Kennedy, Jr.

[15] 3,653,526
[45] Apr. 4, 1972

[54] DRY PRODUCT LOADING APPARATUS
[72] Inventor: Alvin B. Kennedy, Jr., Alvin, Tex.
[73] Assignee: Catalyst Services, Inc., Alvin, Tex.
[22] Filed: July 2, 1970
[21] Appl. No.: 51,800

[52] U.S. Cl. .................. 214/313, 214/704, 214/715
[51] Int. Cl. .................................................. B65g 9/00
[58] Field of Search .............. 214/301, 313, 704, 705, 706, 214/707, 711, 715; 187/8.52

[56] References Cited

UNITED STATES PATENTS

| | | | |
|---|---|---|---|
| 1,168,947 | 1/1916 | Le Valley | 214/704 |
| 1,833,915 | 12/1931 | Schmitt | 214/705 |
| 3,178,048 | 4/1965 | Bergman et al. | 187/10 |
| 3,441,158 | 4/1969 | Wilson | 214/672 |
| 2,052,119 | 8/1936 | Tear | 187/8.52 |
| 2,569,982 | 10/1951 | Estel, Jr. | 187/8.52 |
| 994,859 | 6/1911 | McCune | 214/715 |
| 3,257,007 | 6/1966 | Raynor | 214/625 |
| 3,307,724 | 3/1967 | Miller | 214/313 |

FOREIGN PATENTS OR APPLICATIONS 439,700  3/1912  France ........................... 214/313

Primary Examiner—Gerald M. Forlenza
Assistant Examiner—Lawrence J. Oresky
Attorney—Bertram H. Mann, Frank B. Pugsley, James G. Ulmer, Delmar L. Sroufe and Larry B. Feldcamp

[57] ABSTRACT

Apparatus for loading towers or other vessels with particulate dry product, for instance, catalyst material, which apparatus may be readily transported in recumbent position to the loading area and then erected for elevating the material to the vicinity of the top of the vessel to be loaded. The elevator includes a pivoted carriage in which containers of the material may be positioned and which automatically tilts, upon reaching the unloading position, to dump the material into a hopper from which it is piped to the vessel being loaded.

1 Claims, 11 Drawing Figures

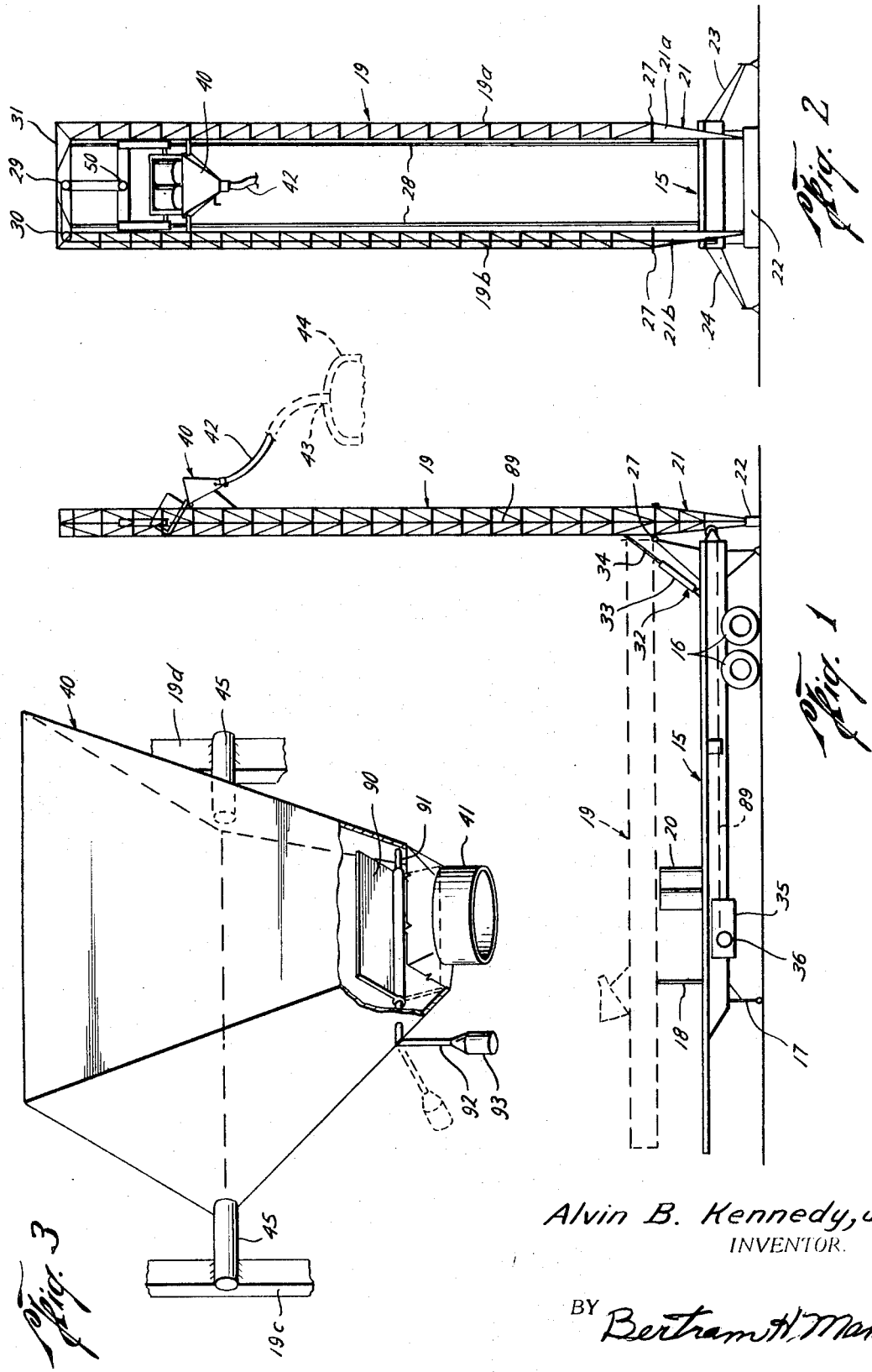

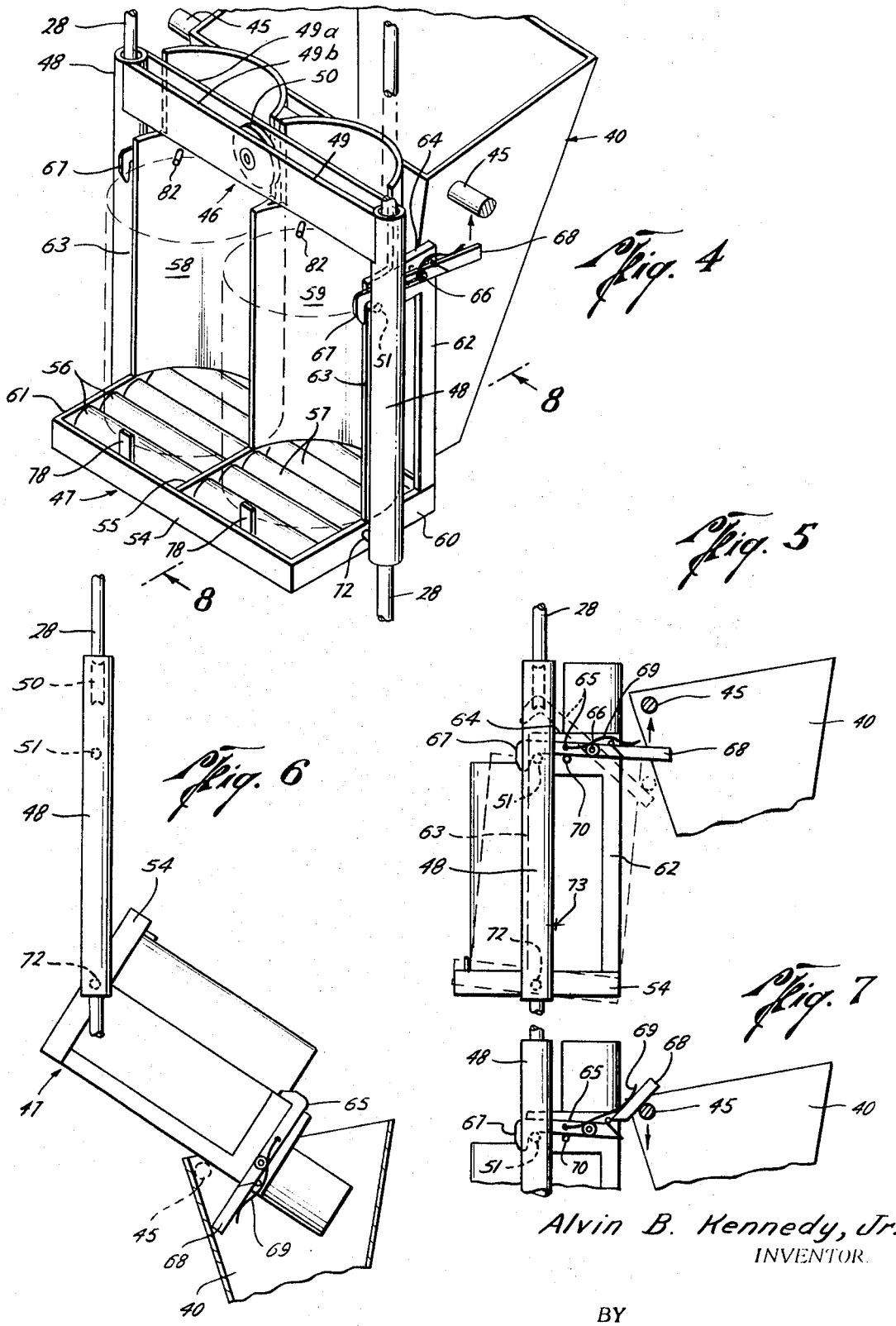

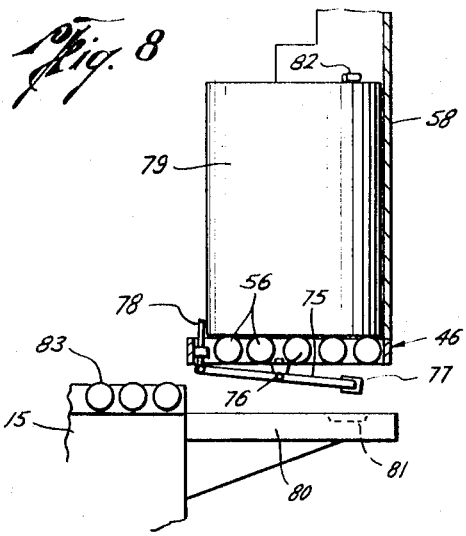
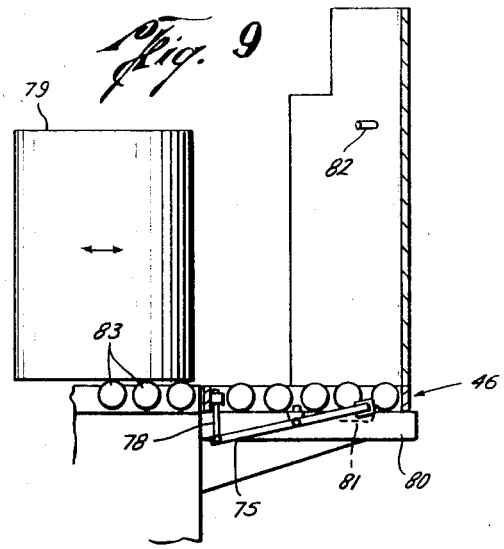
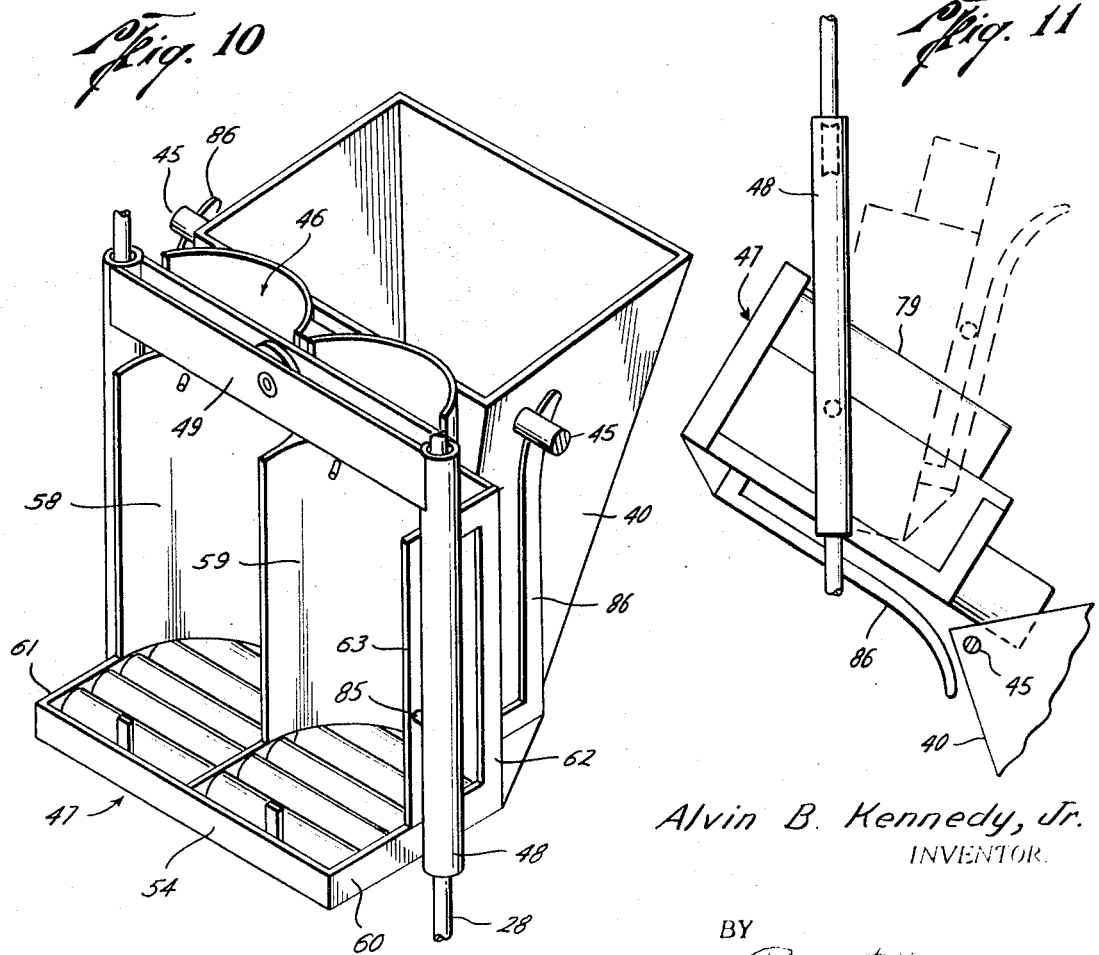
Alvin B. Kennedy, Jr.
INVENTOR.
BY Bertram W. Mann
ATTORNEY

DRY PRODUCT LOADING APPARATUS

BACKGROUND OF THE INVENTION

1. Field of the Invention

The invention relates to mobile apparatus for use in transporting particulate dry product, such as pelletized catalyst material, to a point above the loading opening of a vessel to be charged and automatically dumping the material into the vessel.

2. Description of the Prior Art

While elevators have been provided for transporting fluid material, such as concrete, to elevated locations and then dumping the material, no apparatus has been available or taught in the prior art which is adapted for efficiently loading pelletized catalyst material into vessels wherein chemical processes are performed. For instance, the elevators used in transporting concrete during the construction of reinforced concrete buildings obviously must be custom built for each location, albeit using conventionally provided bars and/or modules which though sometimes used in catalyst loading operations are nevertheless inefficient for this purpose. Also, mobile tower devices are available for various purposes, but none of these has been designed for or is reasonably suggestive of an apparatus which may be conveniently transported to a chemical plant, erected in the vicinity of a vessel to be charged, then utilized for elevating and dumping the catalyst material into the loading opening at the top of the vessel.

SUMMARY OF THE INVENTION

In accordance with the present invention there is provided elongated framing structure forming an elevator chute which is pivotally mounted on a mobile bed, such as a truck trailer. Means, as hydraulic cylinders, are provided for swinging the chute structure into its erect position. The elevator consists of a frame which is guided along the chute structure and powered by a suitable winch or motor and cables. A carriage for accommodating one or more containers of the dry product to be loaded is pivotally mounted on the framing and has latch structure which secures the carriage and containers for transport to the loading position. Cooperating elements at the loading position provide for unlatching the carriage and tilting the same into a position for dumping the material from the containers into a hopper whence it is conducted through suitable piping to the loading point. As the elevator framing is lowered, the carriage is automatically righted so that upon reaching the lower loading position, it is ready for removal of the empty containers and, if necessary, insertion of filled containers for continuing the loading process.

BRIEF DESCRIPTION OF THE DRAWINGS

In the accompanying drawings which illustrate the invention,

FIG. 1 is a side view of the novel loading apparatus in erected position.

FIG. 2 is an end view of the apparatus.

FIG. 3 is an enlarged isometric view of the unloading hopper, portions being broken away to illustrate the underlying parts.

FIG. 4 is an enlarged isometric illustrating the elevator and hopper with the elevator approaching the unloading position.

FIGS. 5, 6, and 7 are schematic representations of the parts in FIG. 4 illustrating the dumping operation and commencement of the return (lowering) movement of the elevator.

FIG. 8 is a vertical transverse sectional view through the tiltable carriage and portions of the loading platform portion of the elevator structure.

FIG. 9 is a view similar to FIG. 8, but showing a product container being loaded onto the elevator carriage.

FIG. 10 is a view similar to FIG. 4, but showing a modified form of elevator carriage.

FIG. 11 is a schematic representation of the parts in FIG. 10, but showing the elevator carriage in dumping position.

DESCRIPTION OF THE PREFERRED EMBODIMENT

FIG. 1 shows a semitrailer including a bed portion generally designated 15 mounted upon rear wheels 16 and provided with a light pivoted support carriage 17 at the forward end and a suitable fifth wheel arrangement (not shown) for coupling to a tractor. Projecting above the forward portion if the trailer bed is a support structure 18 for mounting the free end of the elevator chute structure in its recumbent position, as shown at 19 in dotted lines, and providing space for accommodating loading supplies, as at 20. Elevator base framing 21 is more-or-less permanently secured to the rear end of the bed in upright position and includes vertical side members 21a and 21b. A base block 22 may be positioned beneath base structure 21, and side braces 23 and 24 may be provided during elevating operation.

The main elevator framework 19 is pivotally secured to base framing part 21, as at 27, and includes laterally spaced side structures 19a and 19b directly secured to and forming continuations of base side pieces 21a and 21b. Cable or rigid type guides 28 extend centrally along the inner portions of elevator side pieces 19a and 19b, and sheave wheels 29 and 30 are mounted on the top piece 31. A pair of hydraulic motors are pivotally mounted to the bed in line with side structures 19a and 19b, as at 32, and each includes an hydraulic cylinder 33 receiving a reciprocating hydraulic piston and piston rod 34 connected to side structures 19a and 19b somewhat above the pivoted bottom ends thereof. A power unit is illustrated at 35 which would include a basic power source, either an internal combustion engine or an electric motor, an hydraulic pump for powering elevator lift cylinders 33, and a winch 36. The power unit may be separately mounted, as upon an individual trailer.

Mounted on the elevator framework 19 at an upper unloading position thereon is a hopper 40 having a funneled outlet 41 at its lower end for connection to a flexible hose 42 which leads to the filling opening 43 of a vessel 44 to be charged with the particulate material. A pair of stop forming stub shafts or pintles 45 project oppositely from the sides of trough 40 adjacent the elevator framework, and these may consist of the ends of a continuous bar extending across the hopper opening.

The elevator itself consists of a slide frame portion, generally designated 46, (FIG. 4) and a tiltable carriage, generally designated 47. Frame 46 consists of tubular side pieces 48 which are slidably received on aforementioned guides 28 and a transverse top piece 49 including spaced apart plates 49a and 49b pivotally receiving between them a sheave wheel 50. Short pins 51 project inwardly from intermediate portions of guide pieces 48 for a purpose to be explained.

The carriage 47 includes base framing 54 having an intermediate cross plate 55 and serially arranged rollers 56 and 57. Generally semicylindrical backing stops 58 and 59 project upwardly from the right-hand edge of base 54 (FIG. 4) with their upper edges slightly above the upper edges of frame cross pieces 49a and 49b. Projecting upwardly from the side pieces 60 and 61 of the bottom carriage frame 54 and preferably secured to the outer side edges of stops 58 and 59 are bars as 62 and 63 connected at their tops by cross pieces as at 64. A detent or latch member, as 65, is pivoted as at 66 to each cross piece 64. Each detent or latch has a downwardly extending nose 67 at one end and an arm 68 at the other separately pivoted to the main body of the latch. The latch is constantly urged counterclockwise and the latch parts 65, 68 toward their aligned configuration by a spring 69 and a small pin 70 limits the spring biasing of the latch wherein, when the carriage is in its upright position, as in FIGS. 4 and 5, nose 67 thereof will extend about and engage the corresponding pin 51 on frame guide 48. The carriage is pivotally secured to the mentioned tubular guides 48 by means of pivot pins 72 projecting from carriage base side pieces 60 and 61. In this form of the invention, the pivot pins 72 may be located anywhere in the quadrant below and leftwardly of point 73 symbolizing the center of mass of the carriage (FIG. 5) so that the carriage, when released will tend to tilt in a clockwise direction, that is, toward hopper 40, as will be explained.

As shown in FIG. 8, a pair of levers as at 75 are pivotally mounted to the under edges of carriage base side members 60 and 61, as at 76. The right ends of the levers 75 are weighted, as at 77, or otherwise biased to the positions shown in FIG. 8. At the left ends of the levers 75 are upstanding stop elements 78 which are normally positioned as shown in FIG. 8 so as to overlap the containers 79 resting on rollers 56 or 57. Also shown in FIGS. 8 and 9 are a pair of laterally spaced bars 80 projecting rearwardly from the rear end of trailer bed 15 and connected near their rear ends by a cross bar 81. This bar 81 is positioned so that when carriage 46 is in its lowermost (loading) position, as in FIG. 9, it will engage the right ends of levers 75 so as to rotate these levers counterclockwise sufficiently to withdraw stop elements 78 from the path of a container 79. Additional container stabilizers are shown at 82 projecting inwardly from formed back stops 58 and 59 for abutting the upper edge of the received container. Also shown in FIGS. 8 and 9 are portions of roller-equipped container slides 83 mounted on the rear of the trailer bed in position for directing product containers upon the floor 54 of the carriage, when in its lowermost (loading) position.

FIGS. 10 and 11 show an elevator and fixed trough construction generally similar to the corresponding parts in the first form, including the powered frame part, generally designated 46, and the tiltable carriage, generally designated 47. However, the carriage is pivotally mounted on pins as at 85 extending between intermediate portions of guide tubes 48 and carriage side frame parts 63. These pivot pins, preferably, are located somewhat above the center of mass of the carriage so that the carriage will be stably supported in its upright position, as shown in FIG. 10. Projecting rightwardly (forwardly), then upwardly, from carriage side frame members 62 are tilt enforcing brackets 86 having curved end tips positioned to engage stop pintles 45 as the elevator approaches the unloading position. Thereafter, continued elevation of frame 46, through the interaction of levers 86 and pins 45, causes tilting of carriage 47 from the position in FIG. 10, through the dotted line position in FIG. 11, to the solid line position in FIG. 11 in which the carriage is tilted sufficiently to discharge product from a container or containers 79 into hopper 40. The movement of the elevator is stopped before levers 86 pass beyond stop pins 45, so that the carriage will not be released. As the elevator is lowered, the carriage motion is reversed through the interaction of the heavier bottom portion of the carriage and arms 86 and pins 45.

In the both forms of the invention, an elevating cable 89 extends from winch 36 to a sheave or pulley near the bottom of the chute structure, then upwardly to pulleys 30 and 29, downwardly around traveling pulley 50, then to an anchor point at the top of the chute structure.

FIG. 3 shows details of the hopper 40 including sidewardly projecting stop pins 45 which are secured as by welding to the adjacent bar elements 19c and 19d constituting adjacent longitudinal members of chute-forming girders 19a and 19b. In the lower part of the hopper there is pivotally mounted a flapper valve 90 on a shaft 91 journalled in the side walls of the hopper. Shaft 91 leftwardly of the hopper is turned at a right angle to form the normally depending arm 92 weighted as at 93. This arm indicates whether or not there is product remaining in the hopper, since when such product is in the hopper, valve plate 90 will be urged downwardly causing lifting of lever 92 to the dotted line position. The figure also shows a neck 41 at the lower end of the hopper to which product transport piping 42 is attached.

OPERATION

In order to transport the novel loading apparatus along the highways and about the plant of a user, elevator chute structure 19 will be dropped to the recumbent dotted line position shown in FIG. 1 with its free end resting on support structure 18. When the work area is reached, elevator base framing 21 will be supported and braced as shown at 22, 23, and 24 in FIG. 2, and hydraulic cylinders 33 will be pressured to swing chute structure 19 upwardly to the solid line position in FIG. 1. Guides 28, where cables are used, may be simply loosened when the chute structure is lowered, in which case it will simply be necessary to tighten these cables to prepare them for elevation of product. On the other hand, the cables may be disconnected at the bottom of the chute in which case it may be necessary to rethread the cables through guide tubes 48 and refasten them to the bottom of the chute structure. The transport hose is then secured to the bottom of hopper 40 and led to the filling opening of the vessel to be loaded. With stop elements 78 lowered as in FIG. 9, as they will be when the elevator is in its lowermost or loading position resting against framing 80 near the bottom of the chute structure, one or more drums or other containers 20, 79 are then rolled across elements 83 and onto the floor of the carriage. Top stop elements 82 in contoured drum shields 58 and 59 forming the carriage forward walls are positioned to abut the upper edges of the containers. Winch 36 is then actuated to lift the elevator and contents upwardly through the chute structure. As the elevator leaves chute bottom elements 80,81, stop elements 78 will be moved against the bottoms of the drums to cooperate with top stop elements 82 to lock the drums in position.

As the elevator approaches the unloading position (FIG. 4), latch 65 will engage stop rod or shaft 44 and thereby be rotated to the dotted line position of FIG. 5 in which carriage 47 is released from the powered frame 46. Thereupon, due to the unbalanced mounting of the carriage upon pivot pins 72, the carriage will tilt forward until its forward bars 62 rest against laterally projecting rods or bar parts 45. The upward movement of the elevator will be continued to about the position of FIG. 6 in which the inclination of the carriage is such that product will be fully dumped from containers 79. In this position, the outer extremities of contoured drum shields 58 and 59 will serve as chutes for directing the product into hopper 40. These extensions also bear against stop rods 44 so that the tilting angle of carriage 47 may be increased while retaining the carriage under control. When container 79 has been emptied, the winch is reversed and the elevator lowered which, at first, shifts the elevator to its upright position and re-engages latch 65 with latch pins 51. Latch parts 68 may break upwardly (FIG. 7) in passing pivot pins 44. As the empty elevator approaches its lowermost position for reloading, stops 78 will be withdrawn so that the empty containers can be removed and fresh ones inserted upon the carriage floor for further loading of the vessel or other use of the loading apparatus.

The form in FIGS. 10 and 11 operates the same as that previously described except for the detailed functioning of the carriage tilting parts due to the modified tilting structures 86 and 85.

After completion of the particular operation at hand, the elevator chute structure will be again lowered to its recumbent position of FIG. 1 and transported to the next work area for repetition of the steps just described.

Accordingly, the apparatus renders the charging of vessels, particularly those having elevated charging openings, expeditious and convenient. It is unnecessary to construct permanent scaffolding or other loading instrumentalities, or for each plant to have its own loading facilities, due to the ready transport of the herein described loading apparatus from place to place, the invention may be modified in various respects as will occur to those skilled in the art, and the exclusive use of all modifications as come within the scope of the appended claims is contemplated.

I claim:

1. Loading apparatus for dry product comprising an elevator framework, a slide frame member movable along said frame work between loading and unloading positions thereon, a carriage member tiltable carried by said frame member and normally biased toward its tilted, unloading position, detent and first stop means on said members normally cooperating to maintain said carriage member in its upright position, second stop means on said framework in position to engage said detent and release the same from said first stop means when said carriage member is moved to said unloading position to thereby cause unloading tilting of said carriage member as upward movement thereof continues, and cooperable abutment elements on said framework and said carriage member for upright positioning of said carriage member during lowering thereof from said unloading position, said detent having a part engageable by said second stop means during lowering of said frame member and yieldable to permit said detent to pass said second stop means.

* * * * *